US011383728B2

(12) United States Patent
Stanhope

(10) Patent No.: US 11,383,728 B2
(45) Date of Patent: Jul. 12, 2022

(54) SYSTEM AND METHOD FOR COLLECTING DATA ASSOCIATED WITH THE OPERATION OF AN AGRICULTURAL MACHINE IN DIFFERENT OPERATING MODES

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

( * ) Notice: Subject to any disclaimer, the term of this patent is extended or adjusted under 35 U.S.C. 154(b) by 491 days.

(21) Appl. No.: 16/353,249

(22) Filed: Mar. 14, 2019

(65) Prior Publication Data

US 2020/0290635 A1   Sep. 17, 2020

(51) Int. Cl.
*B60W 50/14* (2020.01)
*B60W 50/08* (2020.01)
*A01B 73/06* (2006.01)
*A01B 63/10* (2006.01)

(52) U.S. Cl.
CPC .......... *B60W 50/082* (2013.01); *A01B 63/10* (2013.01); *A01B 73/065* (2013.01); *B60W 50/14* (2013.01); *B60W 2300/15* (2013.01)

(58) Field of Classification Search
CPC .............. B60W 50/082; B60W 50/14; B60W 2300/15; A01B 63/10; A01B 73/065; A01B 63/02
USPC .......................................................... 701/49
See application file for complete search history.

(56) References Cited

U.S. PATENT DOCUMENTS

| 4,600,060 | A | 7/1986 | Winter et al. |
|---|---|---|---|
| 5,031,704 | A | 7/1991 | Fleischer et al. |
| 5,426,584 | A | 6/1995 | Kamimura et al. |
| 6,397,569 | B1 | 6/2002 | Homburg et al. |
| 6,598,692 | B2 | 7/2003 | Angott |
| 8,057,112 | B2 | 11/2011 | Amadril et al. |
| 8,311,696 | B2 | 11/2012 | Reeve |
| 8,983,713 | B2 * | 3/2015 | Shinohara ............... G07C 5/00 700/112 |
| 9,004,578 | B1 | 4/2015 | Ghannam et al. |

(Continued)

FOREIGN PATENT DOCUMENTS

JP   2005/345318   12/2005

*Primary Examiner* — Peter D Nolan
*Assistant Examiner* — Matthias S Weisfeld
(74) *Attorney, Agent, or Firm* — Rebecca L. Henkel; Rickard K. DeMille

(57) ABSTRACT

A multimodal sensing system for agricultural machines may include an agricultural machine operable in a first operating mode and a second operating mode and a sensor which is movable to adjust its field-of-view between a first field-of-view and a second field-of-view depending on the operating mode of the agricultural machine. The sensor may be configured to generate sensor data associated with the first field-of-view when the agricultural machine is operating in the first operating mode and generate sensor data associated with the second field-of-view when the agricultural machine is operating in the second operating mode. A controller may analyze the sensor data generated when the sensor has the first and second field-of-views so as to provide respective first and second output signals associated with the first and second operating modes, respectively, of the agricultural machine.

18 Claims, 10 Drawing Sheets

(56) References Cited

U.S. PATENT DOCUMENTS

| | | | |
|---|---|---|---|
| 9,148,995 B2 * | 10/2015 | Hrnicek | A01C 23/008 |
| 9,194,725 B2 | 11/2015 | Kaufmann et al. | |
| 9,345,191 B2 | 5/2016 | Kohlhase et al. | |
| 9,880,263 B2 | 1/2018 | Droz et al. | |
| 9,913,426 B2 | 3/2018 | Noll | |
| 10,255,670 B1 * | 4/2019 | Wu | H04N 7/183 |
| 2006/0016940 A1 | 1/2006 | Morgan | |
| 2014/0313335 A1 * | 10/2014 | Koravadi | H04N 5/23216 |
| | | | 348/148 |
| 2017/0003148 A1 | 1/2017 | Gianfranceschi | |
| 2018/0081361 A1 | 3/2018 | Robinson et al. | |
| 2020/0207275 A1 * | 7/2020 | Shimotani | B60R 1/00 |

* cited by examiner

SYSTEM AND METHOD FOR COLLECTING DATA ASSOCIATED WITH THE OPERATION OF AN AGRICULTURAL MACHINE IN DIFFERENT OPERATING MODES

FIELD OF THE INVENTION

The present subject matter relates generally to multimodal sensing systems for agricultural machines and, more particularly, to a system and method for collecting data associated with the operation of an agricultural machine in different operating modes.
trans

BACKGROUND OF THE INVENTION

Agricultural machines, such as work vehicles, agricultural implements, and/or the like, often include a plurality of sensors for collecting data associated with the operation of the agricultural machine. For example, an agricultural machine may include sensors used to gather field condition data or other data related to one or more operating parameters of the agricultural machine as it performs an agricultural operation within a field. However, these sensors typically correspond to single-function sensors that are dedicated solely to the detection of a specific work-related operating parameter. As a result, if it is desired to detect one or more other parameters related to operation of the agricultural machine, an additional sensor(s) or sensing device(s) must be installed on the machine. For example, it is often desired to provide safety-related sensors that allow for collision avoidance during transport of the agricultural machine. However, such safety-related sensors are currently only available as dedicated, add-on sensor options. Unfortunately, these single-function sensors increase the cost-per-feature of integration into an agricultural machine Accordingly, a system and method for collecting data associated with the operation of an agricultural machine in different operating modes that incorporate dual or multi-function sensors would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a multimodal sensing system for agricultural machines. The system may include an agricultural machine operable in a first operating mode and a second operating mode. A sensor is coupled to the agricultural machine such that the sensor is movable relative to a support surface across which the agricultural machine is traversed to adjust a field-of-view of the sensor between a first field-of-view and a second field-of-view. The first field-of-view is different than the second field-of-view relative to the support surface. The sensor may be configured to generate both sensor data associated with the first field-of-view when the agricultural machine is operating in the first operating mode sensor data associated with the second field-of-view when the agricultural machine is operating in the second operating mode. The system may also include a controller communicatively coupled to the sensor. The controller may be configured to analyze the sensor data received when the sensor has the first field-of-view relative to the support surface so as to provide a first output signal associated with operation of the agricultural machine in the first operating mode. The controller may be further configured to analyze the sensor data received when the sensor has the second field-of-view relative to the support surface so as to provide a second output signal associated with operation of the agricultural machine in the second operating mode.

In another aspect, the present subject matter is directed to a method for collecting data associated with the operation of an agricultural machine in different operating modes, the agricultural machine being operable within both a first operating mode and a second operating mode. The method may include receiving, with a computing device, sensor data from a sensor having a first field-of-view relative to a support surface across which the agricultural machine is being traversed as the agricultural machine is operating within its first operating mode and analyzing, with the computing device, the sensor data generated when the sensor has the first field-of-view to provide a first control output associated with operation of the agricultural machine within the first operating mode. The method may also include receiving, with a computing device, a signal associated with transitioning the agricultural machine between the first operating mode and the second operating mode and, following receipt of the signal, controlling an operation of at least one component of the agricultural machine such that the sensor is moved relative to the support surface to adjust a field-of-view of the sensor between the first field-of-view and a second field-of-view, the second field-of-view differing from the first field-of-view. In addition, the method may include receiving, with the computing device, sensor data from the sensor having the second field-of-view relative to the support surface as the agricultural machine is operating within its second operating mode and analyzing, with the computing device, the sensor data generated when the sensor has the second field-of-view to provide a second control output associated with operation of the agricultural machine within the second operating mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 6 and 7 illustrate simplified views of different embodiments of coupling arrangements for coupling the sensor to the agricultural machine in accordance with aspects of the present disclosure;

DETAILED DESCRIPTION OF THE INVENTION

Figure 1:
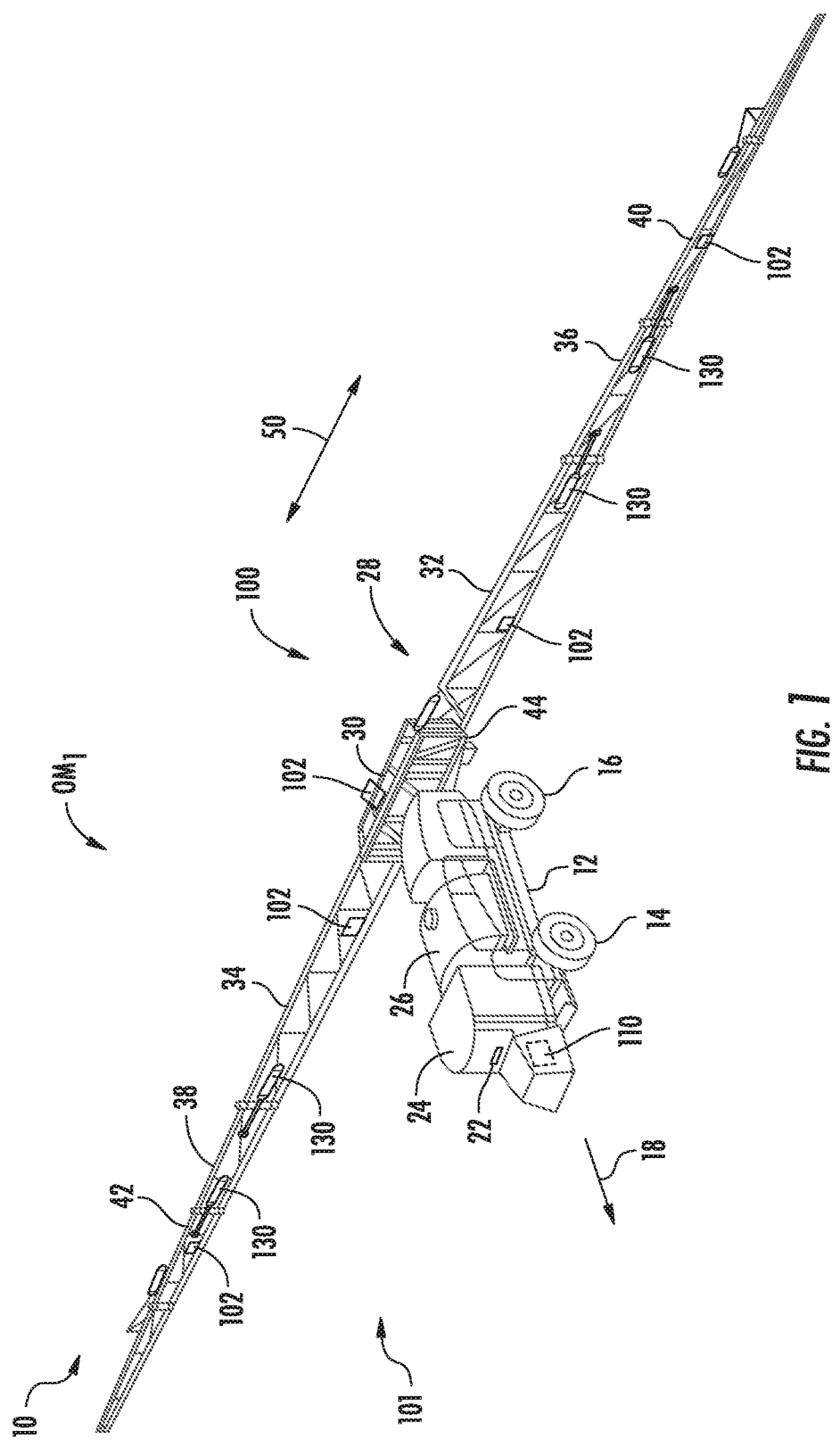
FIG. 1 illustrates a perspective view of one embodiment of an agricultural machine depicted as an agricultural sprayer while operating in a field or work mode in which a boom assembly of the machine is located at an extended or work position, particularly illustrating the agricultural machine equipped with a multimodal sensing system in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for utilizing a multimodal sensing system to collect data associated with the operation of an agricultural machine in different operating modes. Specifically, in several embodiments, an agricultural machine may be operable in a first operating mode and a second operating mode. In one embodiment, the first operating mode may comprise a field mode during which the agricultural machine is configured to perform an agricultural operation relative to a field, such as a spraying operation, a tillage operation, a planting operation, and/or the like. In such an embodiment, the second operating mode may, for example, comprise a transport mode during which the agricultural machine is configured to be transported between two locations without performing an agricultural operation, such as when the machine is being transported along a road or highway between fields.

In several embodiments, at least one sensor may be coupled to the agricultural machine. The sensor may be movable relative to a support surface across which the agricultural machine is traversed to adjust its field-of-view relative to the support surface. Specifically, moving the sensor relative to the support surface may adjust the field-of-view of the sensor between a first field-of-view and a second field-of-view, with the first field-of-view differing from the second field-of-view. In accordance with aspects of the present subject matter, the sensor may be configured to be positioned relative to the support surface so as to be oriented at its first field-of-view when the agricultural machine is operating in the first operating mode, thereby allowing the sensor to capture data associated with operation of the machine within such mode. For example, when the first operating mode corresponds to a work or field mode of the machine, the first field-of-view for the sensor may be selected so as to allow the sensor to capture data associated with one or more work-related parameters associated with the operation being performed within the field, such as by capturing data related to distance to the crop canopy, distance to the soil, weed detection, row detection, clod size, etc. Additionally, when the agricultural machine is operating in its second operating mode, the sensor may be configured to be positioned relative to the support surface so as to be oriented at its second field-of-view, thereby allowing the sensor to capture data associated with operation of the machine with such second operating mode. For example, when the second operating mode corresponds to a transport mode for the machine, the second field-of-view for the sensor may be selected so as to allow the sensor to capture data associated with one or more transport-related parameters related to transporting or moving the machine, such as by capturing data associated with lane detection, edge detection, obstacle detection, overhead clearance, etc.

Moreover, in several embodiments, a controller may be communicatively coupled to the sensor to allow the controller to analyze the sensor data generated by the sensor and subsequently provide suitable control outputs related to the operation of the agricultural machine within its applicable operating mode. For example, with the sensor being oriented at its first field-of-view during operation of the machine within the first operating mode, the controller may be configured to analyze the sensor data received from the sensor and may provide a first control output signal associated with operation of the agricultural machine in the first operating mode. Similarly, with the sensor being orientated at its second field-of-view during operation of the machine within the second operating mode, the controller may be configured to analyze the sensor data received from the sensor and provide a second control output signal associated with the operation of the agricultural machine in the second operating mode. For example, in certain embodiments, the first output signal may be associated with automatically adjusting an operating parameter of agricultural machine during the performance of the agricultural machine, while the second output signal may be associated with providing an operator notification, e.g. a warning indication that an obstacle is detected.

Figure 2:
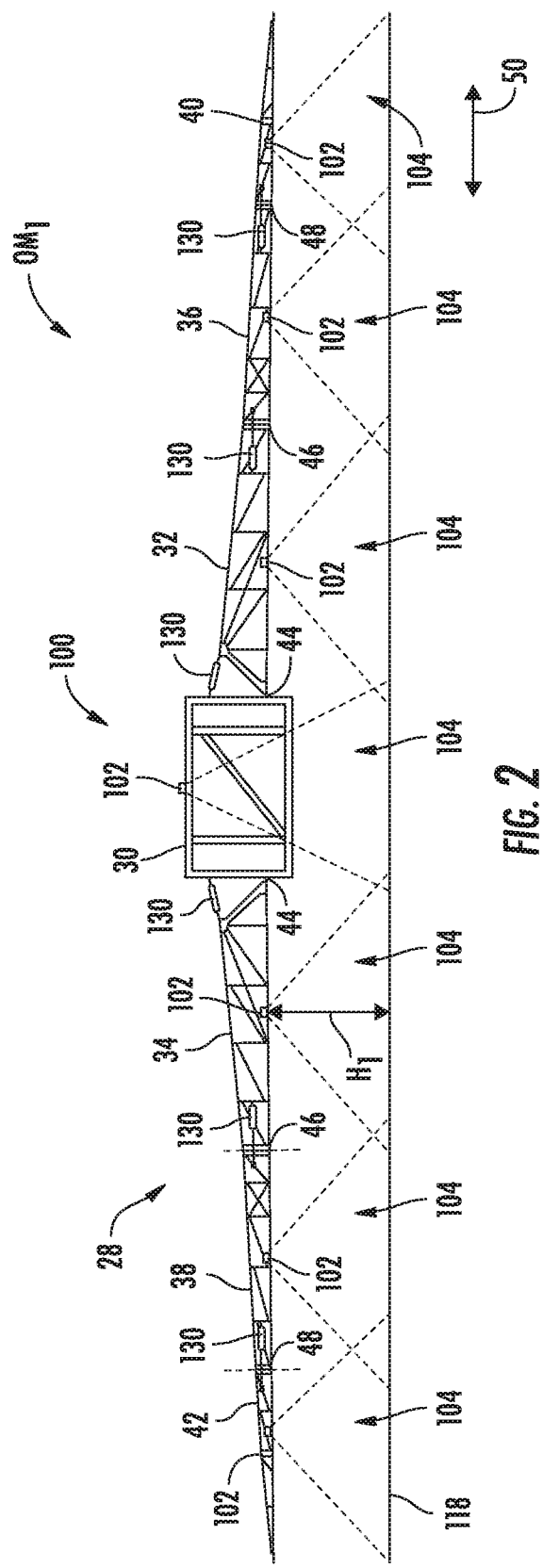
FIG. 2 illustrates a front view of the boom assembly of the agricultural sprayer shown in FIG. 1.
Figure 3:
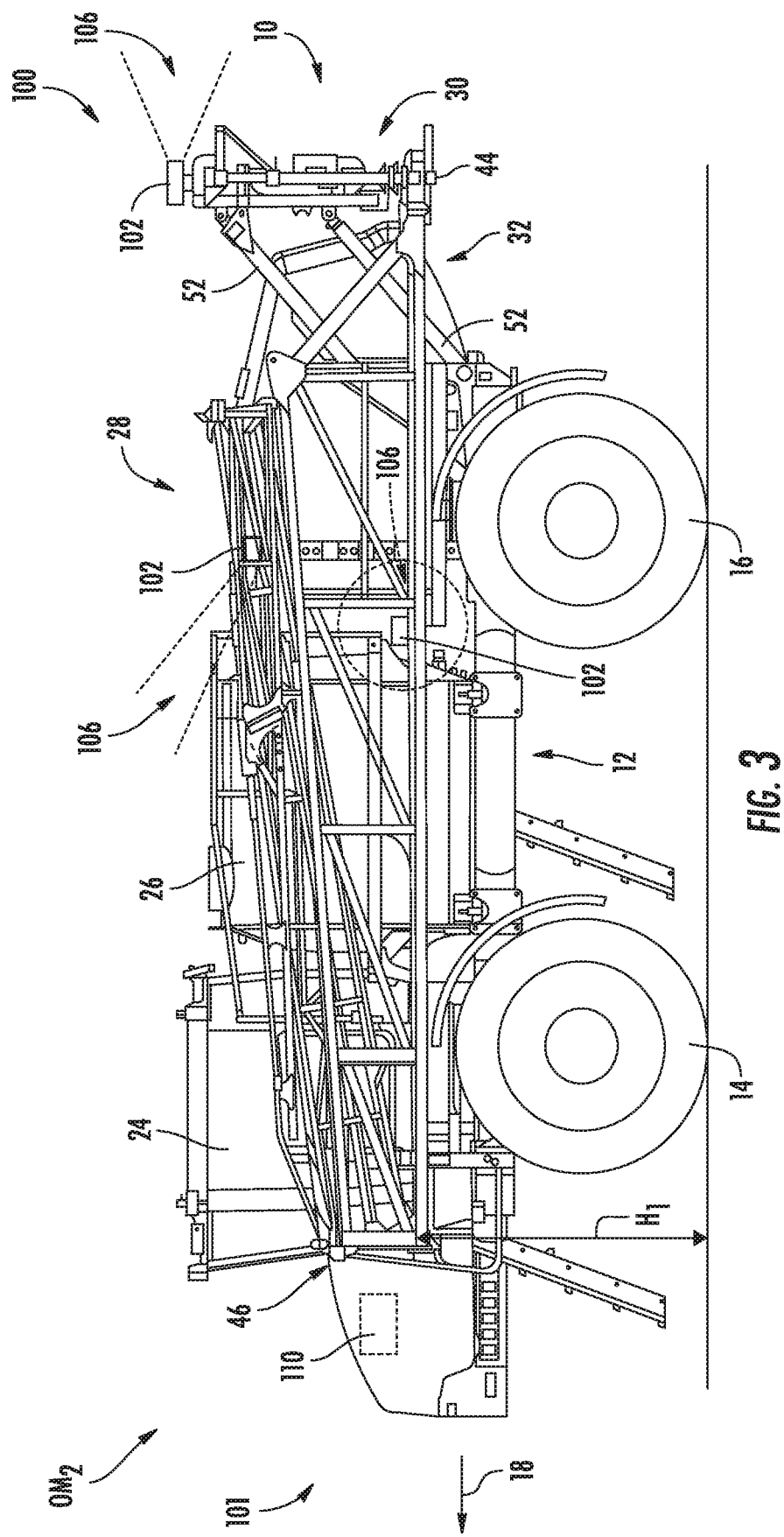
FIG. 3 illustrates a side view of the agricultural sprayer shown in FIG. 1 with the boom assembly located at its folded or transport position to allow the sprayer to be operated within a transport mode in accordance with aspects of the present subject matter.

Referring now to the drawings, FIGS. 1-3 illustrate differing views of one embodiment of an agricultural machine 101 in accordance with aspects of the present subject matter. Specifically, FIGS. 1 and 2 illustrate views of the agricultural machine 101 when the machine 101 is configured for operation within a first operating mode ($OM_1$) and FIG. 3 illustrates a side view of the agricultural machine 101 when the machine 101 is configured for operating within a different, second operating mode ($OM_2$). In the illustrated embodiment, the agricultural machine 101 is depicted as a self-propelled agricultural sprayer 10 by way of example. While an agricultural sprayer is shown and described, it should be understood that the present subject matter is not limited to an agricultural sprayer 10 and thus may be operable with other types of agricultural machines, including any suitable agricultural vehicles and/or implements. For example, the agricultural machine may include or correspond to any suitable towed implement and/or a self-propelled implement, such as a sprayer, a tillage implement, a planter, seeder, etc.

As shown in FIGS. 1 and 2, the first operating mode ($OM_1$) is depicted as a work or field mode during which the agricultural machine 101 is configured to perform an agricultural operation relative to a support surface or field 118. For instance, when configured as a self-propelled sprayer 10, the machine may be configured to perform a spraying operation within its first operating mode ($OM_1$). Additionally, as shown in FIG. 3, the second operating mode ($OM_2$) is depicted as a transport mode during which the agricultural machine 101 is configured to be transported between separate locations without performing an agricultural operation. For instance, in the illustrated embodiment, the agricultural sprayer 10 may be configured to take on a reduced lateral profile within its second operating mode ($OM_2$) to allow the sprayer to be transported to a desired location.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the support surface 118 and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the sprayer 10. For instance, as shown in FIG. 1, the agricultural sprayer 10 may include a control panel 22 for displaying message windows and/or alerts to the operator and/or for allowing the operator to interface with the vehicle's controller 110. In one embodiment, the control panel 22 may include buttons, knobs and/or any other suitable input devices that allow the operator to provide user inputs to the controller 110.

Furthermore, the frame 12 may also support a tank 26 and a multi-section implement or boom assembly 28 mounted on the frame 12. The tank 26 is generally configured to store or hold an agricultural substance, such as a pesticide, a fungicide, a rodenticide, a fertilizer, a nutrient, and/or the like. As is generally understood, a plurality of nozzles (not shown) mounted on the boom assembly 28 may be configured to dispense the agricultural substance stored in the tank 26 onto the underlying plants and/or soil.

As shown in FIGS. 1 and 2, the boom assembly 28 includes a central boom section 30 and a plurality of wing boom sections pivotably coupled to the central boom section 30. Specifically, in the illustrated embodiment, the boom assembly 28 includes inner right and left boom sections 32, 34 pivotably coupled to the central boom section 30, right and left middle boom sections 36, 38 pivotably coupled to the respective right and left inner boom sections 32, 34, and right and left outer boom sections 40, 42 pivotably coupled to the respective right and left middle boom sections 36, 38. Each of the inner boom sections 32, 34 is pivotably coupled to the central boom section 30 at pivot joints 44. Similarly, the middle boom sections 36, 38 are pivotally coupled to the respective inner boom sections 32, 34 at pivot joints 46 while the outer boom sections 40, 42 are pivotably coupled to the respective middle boom sections 36, 38 at pivot joints 48. As is generally understood, pivot joints 44, 46, 48 may be configured to allow relative pivotal motion between the adjacent boom sections of the boom assembly 28. For example, the pivot joints 44, 46, 48 may allow for articulation of the various boom sections between a fully extended position (e.g., as shown in FIGS. 1 and 2), in which the boom sections are unfolded along a lateral direction 50 of the boom assembly 28 to allow for the performance of an agricultural spraying operation during operation of the sprayer within its first operating mode, and a transport position (FIG. 3), in which the boom sections are folded inwardly to reduce the overall width of the boom assembly 28 along the lateral direction 50 to allow for transport of the sprayer 10 within it second operation mode. It should be appreciated that, although the boom assembly 28 is shown in FIG. 2 as including a central boom section 30 and three individual boom sections coupled to each side of the central boom section, the boom assembly 28 may generally have any suitable number of boom sections.

In accordance with aspects of the present subject matter, the agricultural sprayer 10 may also include or be associated with a multimodal sensor system 100 for collecting and analyzing sensor data while the sprayer 10 is being operated. In several embodiments, the system 100 includes one or more sensors 102 coupled to the boom assembly 28 of the sprayer 10. In general, each sensor 102 may be configured to collect or generate sensor data associated with the operation of the sprayer 10 within its first and second operating modes. For instance, when operating in the work or field mode, each sensor 102 may be configured to collect or generate sensor data associated with one or more work-related parameters that relate to the performance of the corresponding agricultural operation within the field, such as one or more field conditions or parameters (e.g., the contour of the ground, surface roughness, etc.) and/or one or more crop conditions (e.g., distance to the crop canopy, the location of crop rows, etc.). Similarly, when operating in the transport mode, each sensor 102 may be configured to collect or generate sensor data associated with one or more transport-related parameters that relate to transporting the agricultural sprayer 10 between separate locations, such as one or more safety parameters associated with collision avoidance (e.g., the location of ditches 216 (FIG. 4B) or edges of a road, highway lane detection, the detection of obstacles 254 (FIG. 4B) located behind or to the sides of the sprayer 10 as it is being backed up or turned, the detection of obstacles overhead, etc.). By configuring each sensor 102 to perform separate functions depending on the operating mode of the sprayer 10 (e.g., field condition detection in the work mode and obstacle detection in the transport mode), the sensor(s) 102 of the multimodal sensor system 100 may provide increased functionality at a reduced cost-per-feature as compared to conventional systems that require separate sensors to provide such functionality.

To allow for the above-described multi-functionality, each sensor(s) 102 of the disclosed multimodal sensor system 100 is configured to be coupled to the boom assembly 28 such that the sensor(s) 102 is movable relative to a support surface 118 (FIGS. 2 and 3) across which the sprayer 10 is being traversed, thereby allowing a field-of-view of the sensor(s) 102 to be adjusted when the sprayer 10 transitions from its first operating mode ($OM_1$) to its second operating mode ($OM_2$) and vice versa. Specifically, as shown in FIG. 2, each sensor(s) 102 may be positioned on and/or oriented relative to the boom assembly 28 so as to have a first field-of-view 104 relative to the support surface 118 when the sprayer 10 is being operated within its first operating mode, such as by having a downwardly oriented field-of-view directed towards the support surface 118 when the boom assembly 28 is at its extended position to allow for the detection of field/crop conditions/parameters or other work-related parameters. Similarly, as shown in FIG. 3, each sensor(s) 102 may be positioned on and/or oriented relative to the boom assembly 28 so as to have a second field-of-view 106 relative to the support surface 118 that differs from the first field-of-view 104 when the sprayer 10 is being operated within its second operating mode, such as by having a field-of-view oriented towards the side or rear of the sprayer 10 when the boom assembly 28 is at its folded or stowed position to allow for the detection of obstacles or other transport-related parameters.

As will be described below, the movement required to allow each sensor(s) 102 to obtain the different fields-of-view relative to the support surface 118 may result from movement of the component on which the sensor is installed (e.g., the boom assembly 28), movement of the sensor relative to the component on which the sensor is installed, an adjustment of a sensor parameter (e.g., lens, mirror, CMOS sensor, antenna, or transceiver orientation or operating parameter) and/or a combination of the three. For example, with reference to the embodiment shown in FIGS. 1-3, the adjustment of the field-of-view of each sensor 102 from the first field-of-view 104 to the second field-of-view 106 may be achieved simply due to the folding of the boom assembly 28 inwardly to its retracted or stowed position. In addition to such movement of the boom assembly 28 (or as an alternative thereto), each sensor 102 may be configured to be separately actuated relative to the boom section on which it is installed (e.g., via an actuatable bracket assembly 220 (FIG. 7)) to allow the field-of-view of the sensor 102 to be adjusted independent of any movement of the boom assembly 28. It should be appreciated that a variation in the field-of-view of a given sensor 102 may generally result from any change in the relative positioning of the sensor 102 to the support surface 118, such as a change in the orientation of the sensor 102 relative to the support surface 118 and/or a change in the distance defined between the sensor 102 and the support surface 118 (e.g., a change in the vertical height of the sensor 102).

Additionally, it should be appreciated that each sensor 102 may generally correspond to any suitable sensor configured to collect data associated with the operation of an agricultural machine 101 in different operating modes. Exemplary sensors 102 may, for example, include cameras, radar devices, LIDAR devices, ultrasonic sensors, and/or the like. For instance, when each sensor 102 corresponds to a radar device, the sensor 102 may be used to detect the vertical height between the boom assembly 28 and the standing crops within the field or between the boom assembly 28 and the support surface 118 while the sensor has its first field-of-view 104 when operating the sprayer 10 in its first operating mode ($OM_1$) and may be used to detect ditches 216 (FIG. 4B) along the side of the road or obstacles 254 (FIG. 4B) positioned along the side or rear of the sprayer 10 while the sensor has its second field-of-view 106 when operating the sprayer 10 in its second operating mode ($OM_2$).

Referring still to FIGS. 1-3, the multimodal sensing system 100 may also include a controller 110 (FIGS. 1 and 3) communicatively coupled to each sensor 102. In general, the controller 110 may be configured to receive the sensor data generated by each sensor 102 and analyze the data to determine one or more parameters associated with the operation of the sprayer 10 within its current operating mode. For instance, when the sprayer 10 is operating within its first operating mode ($OM_1$) and each sensor 102 is generating sensor data associated with its first field-of-view 104, the controller 110 may configured to receive such sensor data and determine the relevant work-related parameter associated with such sensor data. The controller 110 may then provide suitable control signals for controlling the operation of one or more components of the sprayer 10 based on the monitored work-related parameter, such as by automatically adjusting the operation of one or more components of the sprayer 10 based on the monitored work-related parameter or by causing an operator notification to be generated that is associated with the monitored work parameter. For instance, when the monitored work-related parameter corresponds to the distance between the boom assembly 28 and the top of the crops, the controller 110 may be configured to automatically adjust the height of the boom assembly 28 (e.g., via lifting cylinders 52 coupled between the frame 12 and the central boom section) in order to maintain a predetermined distance between the boom assembly 28 and the top of the crops and/or generate an operator notification associated with the monitored distance for display to the operator via the control panel 22 housed within the operator's cab 24. Similarly, when the sprayer 10 is operated within its second operating mode and each sensor 102 is generating sensor data associated with its second field-of-view 106, the controller 110 may configured to receive such sensor data and determine the relevant transport parameter associated with such sensor data. The controller 110 may then provide suitable control signals for controlling the operation of one or more components of the sprayer 10 based on the monitored transport parameter, such as by automatically adjusting the operation of one or more components of the sprayer 10 based on the monitored transport parameter or by causing an operator notification to be generated that is associated with the monitored transport parameter. For instance, when the monitored transport parameter corresponds to the detection of obstacles along the side and/or rear of the sprayer 10, the controller 110 may be configured to automatically control the speed, braking systems, and/or steering systems of the sprayer 10 in order to avoid collision between any detected obstacles and/or generate an operator notification (e.g., a suitable display, audible warning, etc. generated by the control panel 22) associated with notifying the operator of the detected obstacle.

It should be appreciated that, in addition to generating control signals for controlling operation of one or more components of the sprayer 10 in response to the monitored parameters determined based on the sensor data, the controller 110 may also be configured to modify the control settings for each sensor 102 as the field-of-view of the sensor 102 is adjusted when switching between operating modes. For instance, in an embodiment in which each sensor 102 corresponds to a radar-based sensor, the controller 110 may be configured to modify the sensor's bandwidth, pulse pattern, frequency, and/or power output based on whether the sensor 102 is being used during operation within the first or second operating mode. Specifically, when employing a radar sensor to detect field/crop conditions during the performance of a spraying operation, it may be desirable for the sensor to provide data at a higher density, thereby requiring a certain bandwidth, pulse pattern, frequency, and/or power output. However, if the same radar sensor is being used to detect obstacles along the side and/or rear of the sprayer 10 as it is being traversed down a road while in its transport mode, the detection of such obstacles may not require such a heightened resolution and/or government regulations may limit radar-based emissions during transport. In such instance, the controller 110 may be configured to adjust the bandwidth, pulse pattern, frequency, and/or power output of the sensor 102 while collecting data in the transport mode to account for the reduced resolution requirement and/or to accommodate any applicable regulations.

Additionally, it should be appreciated that the controller 110 may be configured to employ different processing algorithms when processing/analyzing the sensor data captured by each sensor 102 based on the operating mode of the sprayer 10. For instance, when each sensor 102 corresponds to a camera, the controller 110 may employ a first image processing algorithm to allow for the detection of field/crop conditions within the captured images while the sprayer 10 is performing a spraying operation within its first operating mode. Similarly, when transporting the sprayer 10 within its second operating mode, the controller 110 may employ a different, second image processing algorithm to allow for the detection of obstacles relative to the sprayer 10.

Figure 4A:
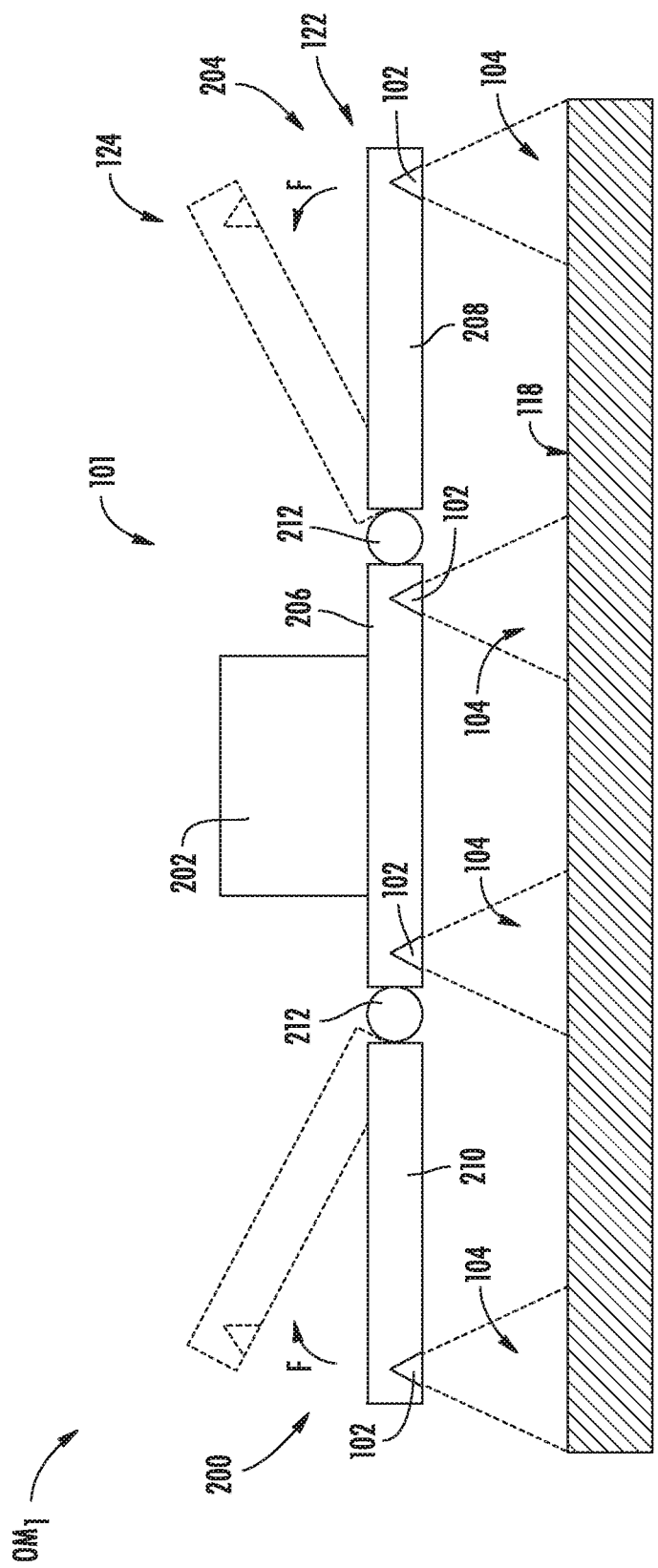
FIG. 4A illustrates a schematic view of another embodiment of an agricultural machine, such as a multi-section implement, while operating in a field or work mode in which the multi-section implement is located at an extended or work position, particularly illustrating the agricultural machine equipped with a multimodal sensing system in accordance with aspects of the present subject matter.
Figure 4B:
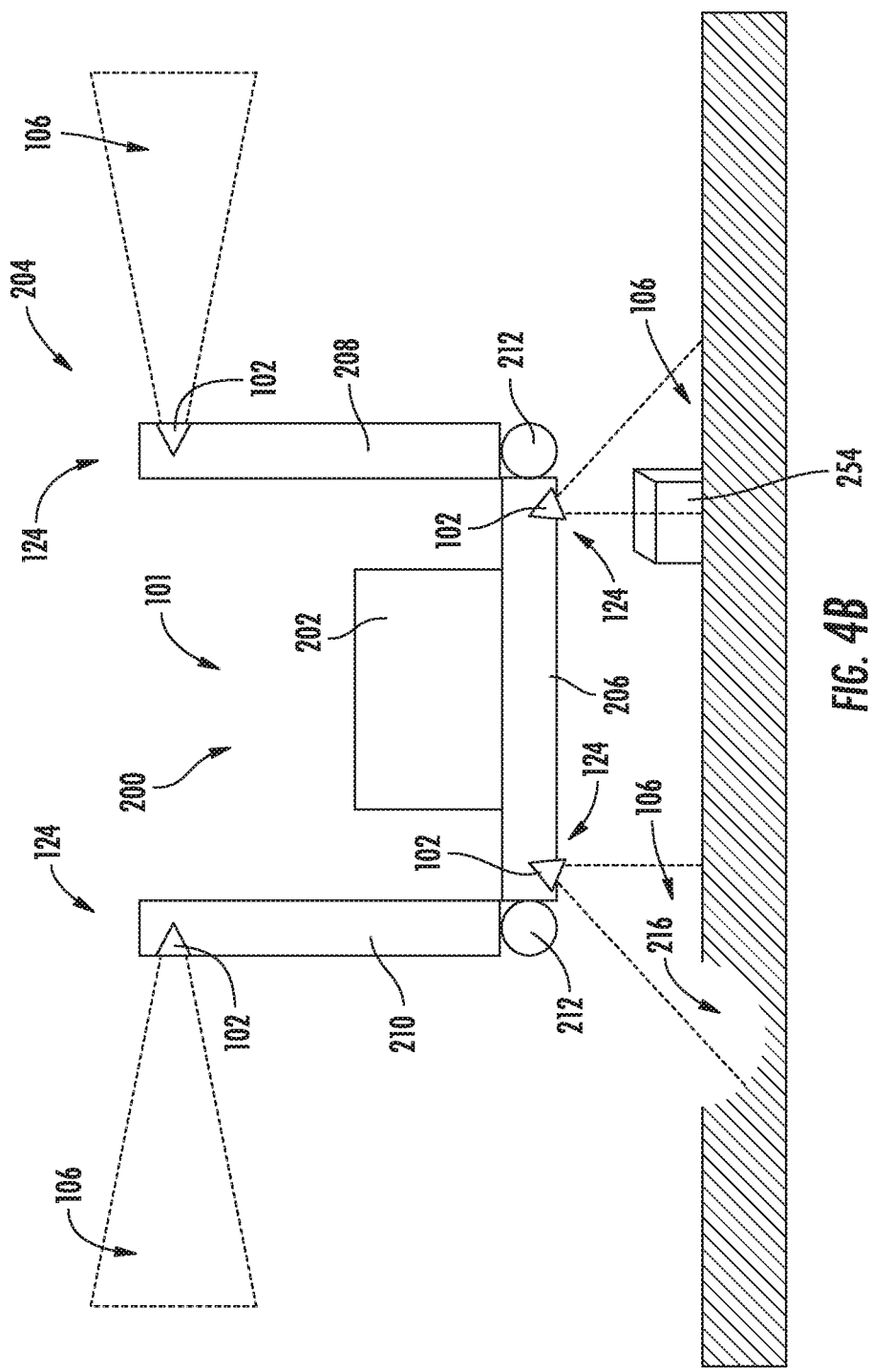
FIG. 4B illustrates a schematic view of the agricultural machine shown in FIG. 4A with the multi-section implement located at its folded or transport position to allow the agricultural machine to be operated within a transport mode in accordance with aspects of the present subject matter.
Figure 5:
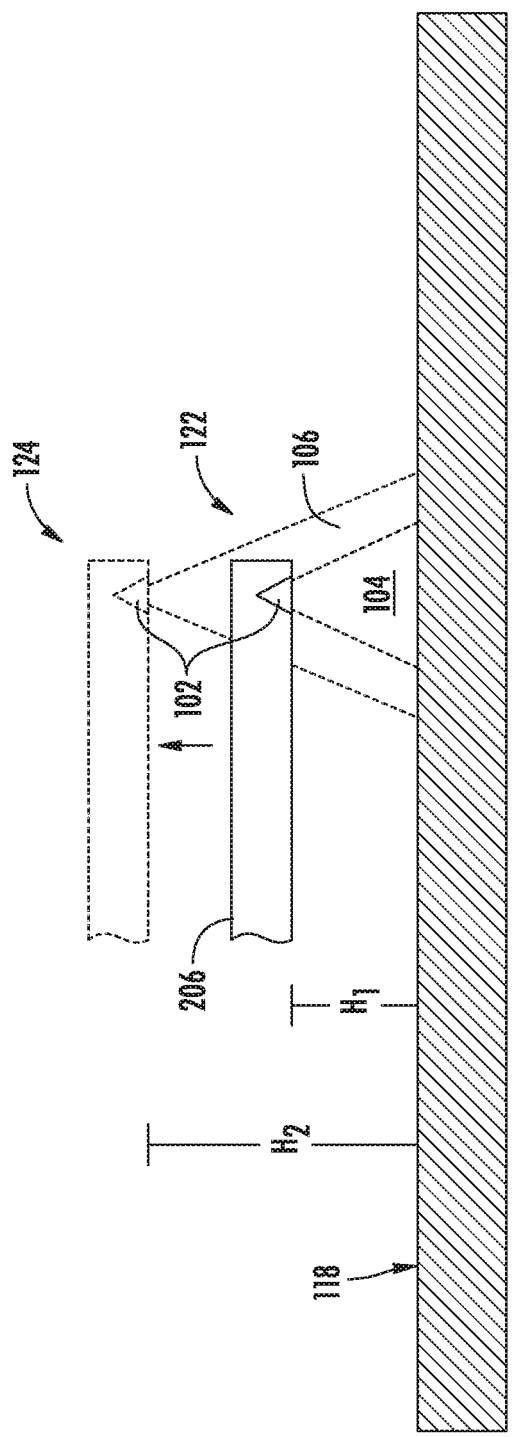
FIG. 5 illustrates a schematic view of a portion of the multi-section implement shown in FIG. 4A, particularly illustrating the implement transitioning from a first height to a second height.

Referring now to FIGS. 4A, 4B, and 5, differing views of another embodiment of an agricultural machine 101 are presented in accordance with aspects of the present subject matter. Specifically, FIG. 4A illustrates a view of the agricultural machine 101 when the machine is configured for operation within a first operating mode ($OM_1$) and FIG. 4B illustrates a view of the agricultural machine when the machine 101 is configured for operation within a second operating mode ($OM_2$). FIG. 5 illustrates a portion of the agricultural machine 101 which may be transitioned between a first operating height $H_1$ and a second operating height $H_2$ as the agricultural machine 101 transitions between the first operating mode ($OM_1$) and the second operating mode ($OM_2$). In the illustrated embodiment, the agricultural machine 101 is depicted as a multi-section implement 200, such as a tillage implement. While a tillage implement is described, it should be understood that the present subject matter is not limited to tillage-related implements and thus may be operable with other types of agricultural machines, including any suitable agricultural vehicles and/or implements. For example, the agricultural machine may include or correspond to any other suitable multi-section implement, such as a planter or seeder.

As shown in FIG. 4A, the first operating mode ($OM_1$) is depicted as a work or field mode during which the implement 200 is configured to perform an agricultural operation relative to a support surface or field 118. For instance, when configured as a tillage implement, the machine 101 may be configured to perform a tillage operation within its first operating mode ($OM_1$). Additionally, as shown in FIG. 4B, the second operating mode ($OM_2$) is depicted as a transport mode during which the implement 200 is configured to be transported between separate locations without performing an agricultural operation. For instance, in the illustrated embodiment, the multi-section implement 200 may be configured to take on a reduced lateral profile within its second operating mode ($OM_2$) to allow the implement 200 to be transported to a desired location.

As shown in FIG. 4A, the multi-section implement 200 may include a chassis or frame 202 configured to support or couple to a plurality of components, such as a plurality of ground-engaging tools (not shown). In particular, the frame 202 may be configured as support a multi-section frame assembly 204. As shown in FIGS. 4A and 4B, the multi-section frame assembly 204 includes a central section 206 and a plurality of wing sections or outer sections 208, 210 pivotably coupled to the central section 206. Each of the wing sections 208, 210 is pivotably coupled to the central section 206 at pivot joints 212. As is generally understood, pivot joints 212 may be configured to allow relative pivotal motion between adjacent frame sections of the multi-section frame assembly 204. For example, the pivot joints 212 may allow for articulation of the various wing sections between a fully extended position, in which the wing sections are unfolded along a lateral direction 50 of the multi-section implement 200 to allow for the performance of an agricultural operation during operation of the agricultural machine 101 within its first operating mode ($OM_1$), and a transport position (FIG. 4B) in which the wing sections are folded upwardly along arc F to reduce the overall width of the implement 200 along the lateral direction 50 to allow for transport of the implement 200 within its second operation mode ($OM_2$). It should be appreciated that, although the multi-section frame assembly 204 is shown in FIGS. 4A and 4B as including a central section 206 and two individual wing sections 208, 210 coupled to each side of the central section 206, the frame assembly 204 may generally have any suitable number of wing sections.

In accordance with aspects of the present subject matter, the multi-section implement 200 may also include, or be associated with, a multimodal sensor system 100 for collecting and analyzing sensor data while the implement 200 is being operated. In several embodiments, the system 100 includes one or more sensors 102 coupled to the frame assembly 204 of the multi-section implement 200. In general, each sensor 102 may be configured to collect or generate sensor data associated with operation of the implement 200 within its first and second operating modes. For instance, when operating in the work or field mode $OM_1$), each sensor 102 may be configured to collect or generate sensor data associated with one or more work-related parameters that relate to the performance of the corresponding agricultural operation within the field, such as one or more field condition parameters and one or more crop conditions. Similarly, when operating in the transport mode, each sensor 102 may be configured to collect or generate sensor data associated with one or more transport-related parameters that relate to transporting the implement 200 between separate locations, such as one or more safety parameters associated with collision avoidance.

Similar to the embodiment described above with reference to FIGS. 1-3, each sensor 102 is configured to be coupled to the frame assembly 204 such that the sensors 102 are movable relative to the support surface 118 across which the agricultural machine 101 is being traversed, thereby allowing the field-of-view of the sensor 102 to be adjusted when the implement 200 transitions from its first operating mode ($OM_1$) to its second operating mode ($OM_2$) and vice versa. Specifically, as shown in FIGS. 4A, 4B, and 5, each sensor 102 may be positioned on and/or oriented relative to the wing assembly 204 so as to have a first field-of-view 104 relative to the support surface 118 when the implement 200 is being operated within its first operating mode ($OM_1$), such as by having a downwardly oriented field-of-view directed towards the support surface 118, when the frame assembly 204 is at its extended position, to allow for the detection of field/crop conditions/parameters or other work-related parameters. Similarly, as shown in FIG. 4B, each sensor 102 may be positioned on and/or oriented relative to the frame assembly 204 so as to have a second field-of-view 106 relative to the support surface 118 that differs from the first field-of-view 104 when the implement 200 is being operated within its second operating mode ($OM_2$), such as by having a field-of-view oriented towards the side or rear of the implement 200, when the wing assembly 204 is at its folded or stowed position, to allow for the detection of obstacles or other transport-related parameters.

Similar to the embodiment described above with reference to FIGS. 1-3, the movement required to allow each sensor 102 to obtain the different fields-of-view relative to the support surface 118 may result from movement of the component on which the sensor is installed (e.g., the frame assembly 204), movement of the sensor relative to the component on which the sensor is installed, and/or a combination of the two. For instance, as depicted in FIGS. 4A-5, each sensor 102 may have its first field-of-view 104 when disposed at a first sensor position 122 relative to the support surface 118. Additionally, each sensor 102 may its second field-of-view 106 when disposed at a second sensor position 124 relative to the support surface 118. In such an embodiment, the transition of the sensor 102 between its first and second sensor positions 122, 124 may, for example, be accomplished by folding the wing sections 208, 210 vertically relative to the central section 206 along the arc F. In another embodiment, such as depicted specifically in FIG. 5, the one of the frame sections (e.g., the central section 206) and the attached sensor 102 may be transitioned between a first height $H_1$ and a second height $H_2$ relative to the support surface 118. In such an embodiment, the adjustments of the height of the frame section(s) relative to the support surface 118 results in the sensor 102 transitions between its sensor positions 122, 124, thereby adjusting the field of view of the sensor 102 relative to the support surface 118. Similarly, as will be described below with reference to FIG. 7, each sensor 102 may, for example, be coupled to the frame assembly 204 via an actuatable bracket assembly 220 to allow the orientation of the sensor 102 relative to the frame assembly 204 to be adjusted, thereby allowing the sensor to transition between its sensor positions 122, 124.

As discussed previously with reference to the embodiment shown in FIGS. 1-3, the multimodal sensing system 100 may also include a controller 110 (FIG. 1) that is configured to receive the sensor data generated by each sensor 102 and analyze the data to determine one or more parameters associated with the operation of the multi-section implement 200 within its current operating mode. For instance, when the implement 200 is operated within its first operating mode ($OM_1$) and each sensor 102 is generating sensor data associated with its first field-of-view 104, the controller 110 may be configured to receive such sensor data and determine the relevant work-related parameter associated with such sensor data. The controller 110 may then provide suitable control signals for controlling operation of one or more components of the implement 200 based on the monitored work-related parameter, such as by automatically adjusting the operation of one or more components of the implement 200 based on the monitored work-related parameter or by causing an operator notification to be generated that is associated with the monitored work parameter. Similarly, when the multi-section implement 200 is operated within its second operating mode ($OM_2$) and each sensor 102 generates sensor data associated with its second field-of-view 106, the controller 110 may be configured to receive such sensor data and determine the relevant transport parameter associated with such sensor data. The controller 110 may then provide suitable control signals for controlling operation of one or more components of the implement 200 based on the monitored transport parameter, such as by automatically adjusting the operation of one or more components of the implement 200 based on the monitored transport parameter or by causing an operator notification to be generated that is associated with monitored transport parameter.

Figure 6:
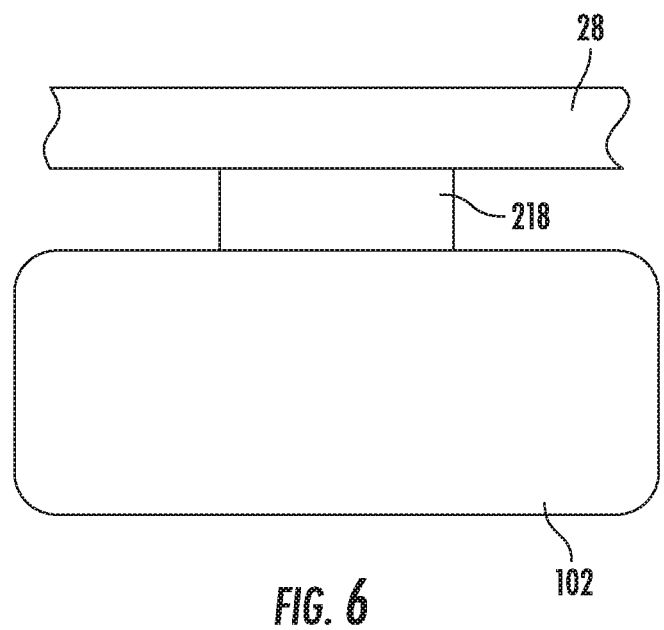
FIG. 6 illustrates a side view of yet another embodiment of an agricultural machine equipped with a hinged implement, which is located in a folded or transport position to allow the agricultural machine to be operated within a transport mode in accordance with aspects of the present subject matter.
Figure 7:
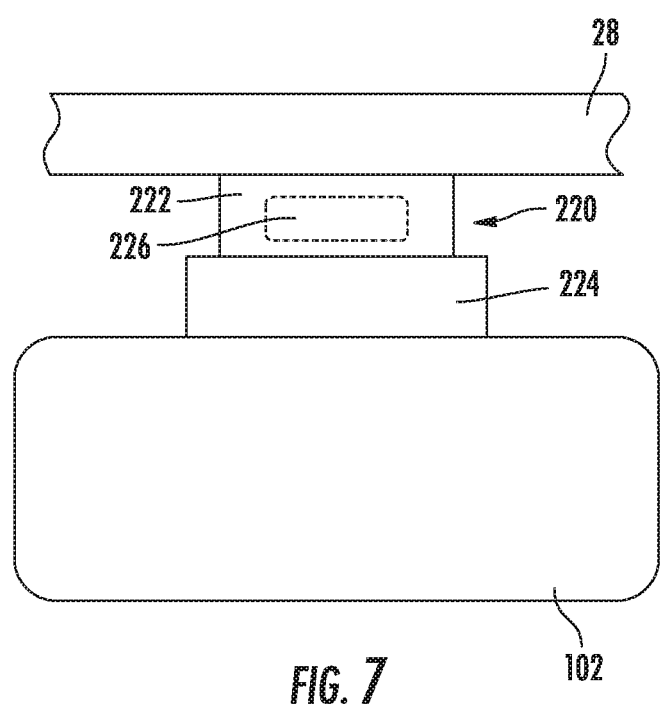

Referring now to FIGS. 6 and 7, schematic views of different mounting arrangements for coupling one of the disclosed sensors 102 to a portion of an agricultural machine 101 are illustrated in accordance with aspects of the present subject matter. Specifically, for purposes of discussion, FIGS. 6 and 7 will be described with reference to coupling a sensor 102 to a portion of the boom assembly 28 shown in FIGS. 1-3. However, it should be appreciated that the mounting arrangements shown in FIGS. 6 and 7 may generally be used to couple a sensor 102 to any suitable portion of an agricultural machine, such as a portion of the frame of any suitable implement or the wing segments discussed with regard to the embodiment depicted in FIGS. 4A and 4B.

As shown in FIG. 6, in one embodiment, each sensor 102 may be coupled to a portion of the boom assembly via a fixed connection, such as by using a fixed bracket 218 or other fixed mounting assembly. In such an embodiment, the field-of-view of the sensor 102 may be configured to be adjusted with adjustments in the position of the boom assembly 28 relative to the support surface 118, such as by changing the height and/or the orientation of the boom assembly 28 relative to the support surface 118.

As an alternative to the fixed mounting arrangement, each sensor 102 may be configured to be coupled to the adjacent portion of the associated agricultural machine 101 via an actuatable or adjustable bracket assembly 220. For instance, as shown in FIG. 7, the sensor 102 is coupled to the adjacent portion of the boom assembly 28 via an actuatable or movable bracket assembly 220. The employment of such a bracket assembly allows the sensor 102 to be actuated or moved to adjust its field-of-view independent of position, orientation, and/or movement of the portion of the boom assembly 28 to which it is attached. Specifically, by being movably coupled to the boom assembly 28 via the movable bracket assembly 220, the sensor 102 may be rotated, tilted, and/or panned relative to the boom assembly 28 in response to the sprayer 10 or tillage implement transitioning between its first and second operating modes.

As shown in FIG. 7, in one embodiment, the actuatable bracket assembly 220 may include a first bracket component 222 rigidly coupled to the adjacent portion of the boom assembly 28 and a second bracket component 224 rigidly coupled to the sensor 102. In such an embodiment, the second bracket component 224 may be configured to be actuated relative to the second bracket component 222 in one or more directions (e.g., via a suitable actuator 226, such as one or more motors) to adjust the orientation/positioning of the sensor 102 relative to the boom assembly 28. Of course, in other embodiments, the bracket assembly 220 may have any other suitable configuration that allows the sensor 102 to be moved independent of the boom assembly 28 to adjust the field-of-view of the sensor 102.

It should be appreciated that in one embodiment, the movement required to allow each sensor(s) 102 to obtain the different fields-of-view relative to the support surface 118 may result from an adjustment of the orientation of a component or parameter of the sensor(s) 102 itself relative to the fixed bracket 218 or other fixed mounting assembly. Such an adjustment of the orientation of the component or parameter of the sensor(s) 102 may include adjusting the orientation or operating parameters of a lens, mirror, CMOS sensor, antenna, or transceiver of the sensor(s) 102. For example, the sensor 102 may be a radar sensor fixedly coupled to the agricultural machine 101. The radar sensor may change the direction of the transceived radio signals in response the agricultural machine 101 transitioning between the first operating mode ($OM_1$) and the second operating mode ($OM_2$) so as to adjust a field-of-view of the sensor between the first field-of-view 104 and the second field-of-view 106.

Figure 8:
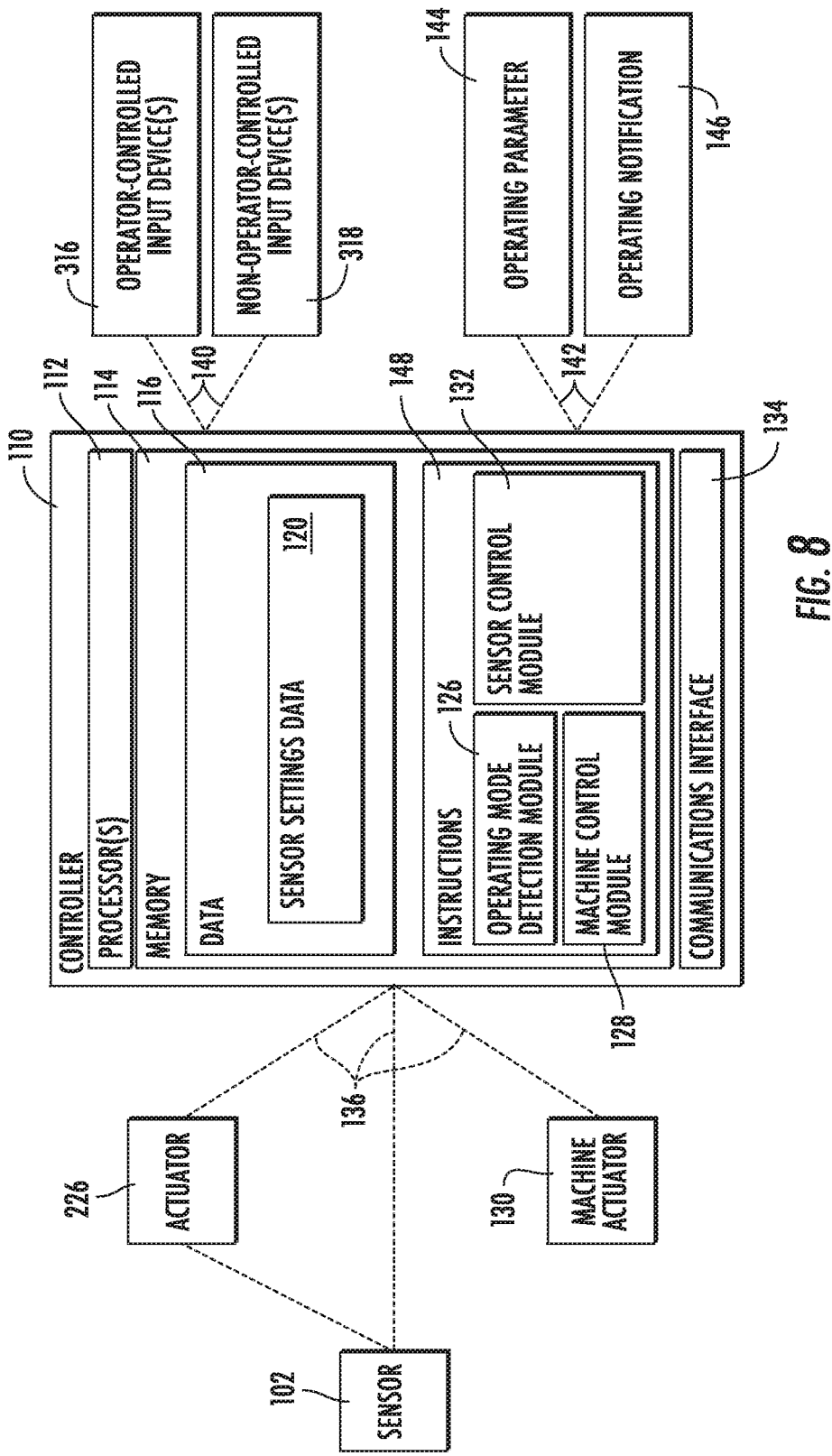
FIG. 8 illustrates a schematic view of one embodiment of a multimodal sensing system for collecting data associated with the operation of an agricultural machine in different operating modes in accordance with aspects of the present subject matter.

Referring now to FIG. 8, a schematic view of one embodiment the multimodal sensing system 100 described above for collecting data associated with the operation of an agricultural machine 101 in different operating modes is illustrated in accordance with aspects of the present subject matter. In general, the system 100 shown in FIG. 8 will be described herein with reference to the various system components described above with reference to FIGS. 1-7. For instance, as shown in FIG. 8, the system 100 may include the one or more sensors 102 and associated controller 110 described above with reference to FIGS. 1-7.

In general, the controller 110 may correspond to any suitable processor-based device(s), such as a computing device or any combination of computing devices. As shown in FIG. 8, the controller 110 may generally include one or more processors 112 and associated memory devices 114 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 114 may generally comprise memory elements including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114 may generally be configured to store information accessible to the processor(s) 112, including data 116 that can be retrieved, manipulated, created and/or stored by the processor(s) 112 and instructions 148 that can be executed by the processor(s) 112.

In several embodiments, the data 116 may be stored in one or more databases. For example, the memory 114 may include a sensor settings database 120 for storing one or more specific sensor settings to be applied in connection with the current operating mode of the associated agricultural machine. For instance, the controller 110 may be configured to adjust the sensor settings for each sensor 102 to accommodate the differing fields-of-view for each sensor 102 defined within each operating mode. Specifically, as indicated above, when each sensor 102 is configured as a radar sensor, the controller 110 may be configured to adjust the bandwidth, frequency, and/or power output settings for each sensor 102 based on whether the sensor is being used to collect data associated with work-related parameters while in the work mode or transport-related parameters when in the transport mode. In such an embodiment, the specific settings for each operating mode may be stored within the sensor settings database 120. Similarly, when each sensor 102 is configured as a camera, the controller 110 may include differing light sensitivity settings stored within its memory to account for the differing field-of-view between the first and second operating modes, such as when each sensor 102 is oriented downwardly towards the adjacent support surface 118 when in the work mode but is oriented horizontally across the support surface 118 or even upwardly relative to the support surface 118 when in the transport mode. Additionally, the settings stored within the sensor settings database 120 may also correspond to mode-specific position or orientation settings for each sensor 102. For instance, when the orientation of each sensor 102 is configured to be adjusted independent of the adjacent agricultural machine, the desired sensor position or orientation for each operating mode may be stored within the controller's memory 114.

Referring still to FIG. 8, in several embodiments, the instructions 148 stored within the memory 114 of the controller 110 may be executed by the processor(s) to implement an operating mode detection module 126. In general, the operating mode detection module 126 may be configured to determine when a change in the operating mode of the associated agricultural machine 101 is directed based on inputs received by the controller 110. For instance, in several embodiments, the operating mode detection module 126 may be configured to determine that the operator desires that the operating mode of the agricultural machine be switched based on operator inputs received from one or more operator-controlled input devices 316, such as one or more input devices located within the cab 24 of the agricultural machine 101. For example, the operator may provide inputs indicative of a desired change in operating mode of the machine, such as an input indicating selection of a given operating mode for the agricultural machine 101 (e.g., field mode vs. transport mode). In such an embodiment, based on the received operator input, the operating mode detection module 126 may determine a transition between operating modes should be initiated. Alternatively, the inputs may be received from non-operator-controlled input devices 318, such as a speed sensor or a position sensor. For example, the non-operator-controlled input device may be configured to detect when the speed of the agricultural machine 101 exceeds a preset threshold. Upon detecting a speed in excess of the preset threshold, the controller 110 may determine that the agricultural machine 101 has transitioned between operating modes.

Moreover, as shown in FIG. 8, the instructions 148 stored within the memory 114 may be executed by the processor(s) 112 to implement a machine control module 128. In general, the machine control module 128 may be configured to control the operation of one or more components of the agricultural machine in order to transition the machine between its operating modes. For instance, as shown in FIG. 8, the controller 110 may be communicatively coupled to one or more machine actuators 130, such as one or more hydraulic folding cylinders, configured to actuate the associated machine implement between its extended or work position and its folded or transport position. In such an embodiment, when it is determined that the operator desires to transition between the machine's work mode to the machine's transport mode (e.g., via the determination made by the operating mode detection module 126), the machine control module 128 may be configured to control the operation of the machine actuators 130 to fold the associated implement into the transport position. Similarly, when it is determined that the operator desires to transition from the machine's transport mode to the machine's field mode, the machine control module 128 may be configured to control the operation of the machine actuators 130 to unfold the associated implement from its transport position to its extended or work position.

Moreover, as shown in FIG. 8, the instructions 148 stored within the memory 114 may be executed by the processor(s) 112 to implement a sensor control module 132. In general, the sensor control module 132 may be configured to control the operation of each sensor 102 and/or any related components to provide the desired field-of-view and/or sensor settings based on the current operating mode of the agricultural machine. For instance, as indicated above, in several embodiments, each sensor 102 may be supported on its associated agricultural machine via an actuatable mounting assembly. In such embodiments, the sensor control module 132 may be configured to control the operation of the corresponding sensor or bracket actuator 226 to ensure that each sensor 102 has the desired field-of-view for the current operating mode of the machine. For example, when transitioning between operating modes, the controller 110 may reference the sensor settings database to determine the desired sensor orientation for the new operating mode and subsequently control the operation of the associated bracket actuator to actuate the sensor relative to the machine to such desired orientation. Similarly, when transitioning between operating modes, the controller 110 may also be configured to reference the sensor settings database 120 to determine if any additional sensor settings (e.g., power output settings, light sensitivity settings, etc.) should be adjusted to account for the switch between operating modes.

Referring still to FIG. 8, the controller 110 may also include a communications interface 134 to provide a means for the controller 110 to communicate with any other system component of the agricultural machine and/or the operator. For instance, one or more communicative links or interfaces 136 (e.g., one or more data buses) may be provided between the communications interface 134 and the sensor 102 and/or the actuator 226 to allow control signals from the controller 110 to be transmitted to such devices and/or to allow data from such devices to be transmitted to the controller 110. Similarly, one or more input communicative links or interfaces 140 (e.g., one or more data buses) may be provided between the communications interface 134 and the input devices 316 and 318 to allow the controller 110 to receive inputs therefrom. Additionally, one or more output links or interfaces 142 (e.g., one or more data buses) may be coupled to the communications interface 134 so as to enable the controller 110 to adjust an operating parameter 144 of the agricultural machine 101 or generate an operating notification 146 to the operator.

Figure 9:
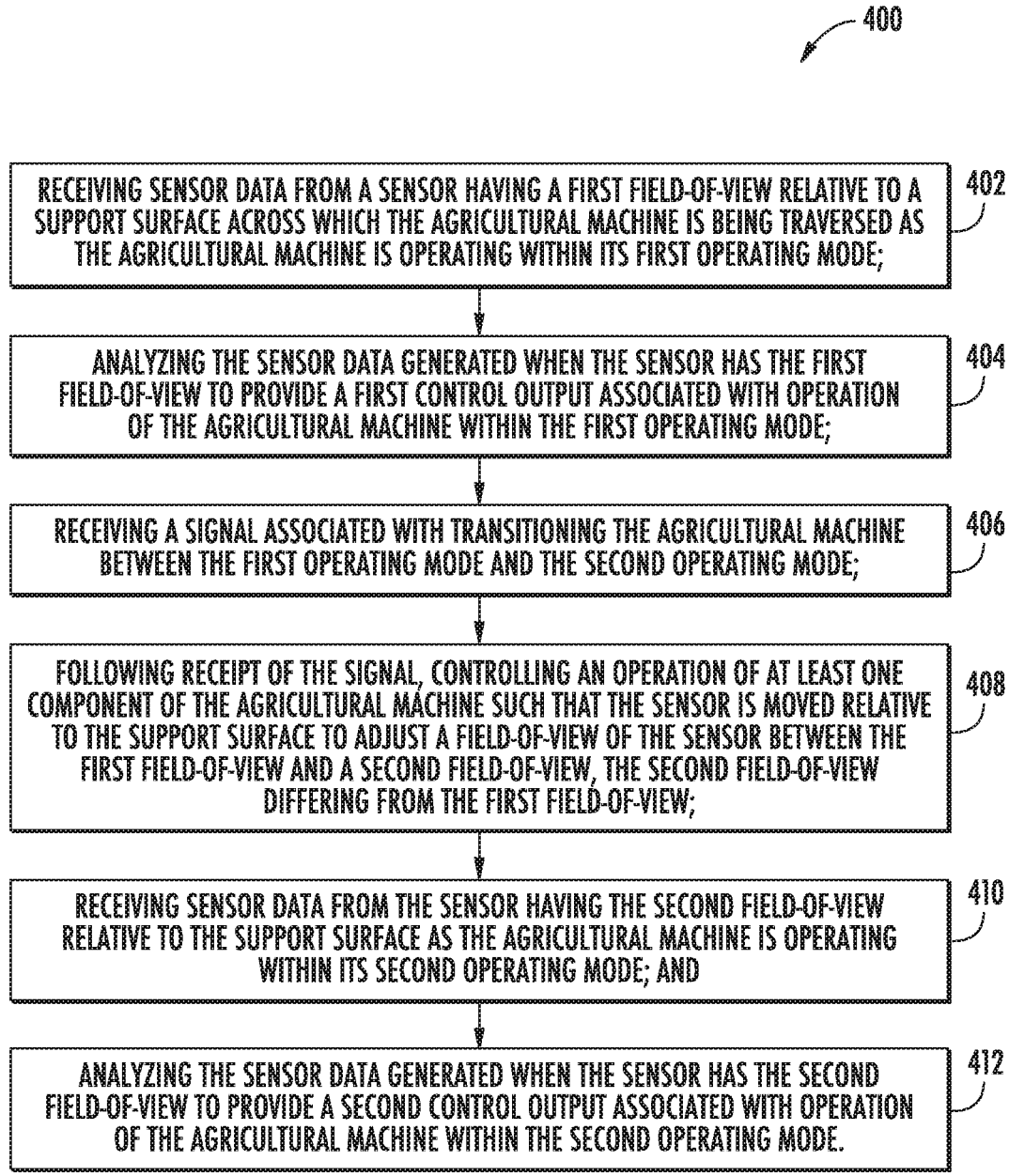
FIG. 9 illustrates a flow diagram of one embodiment of a method for collecting data associated with the operation of an agricultural machine in different operating modes in accordance with aspects of the present subject matter.

Referring now to FIG. 9, a flow diagram of one embodiment of a method 400 for collecting data associated with the operation of an agricultural machine in different operating modes is illustrated in accordance with aspects of the present subject matter. In general, the method 400 will be described herein with reference to the embodiments of the multimodal sensing system 100 shown in FIGS. 1-8. Although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and-or adapted in various ways without deviating from the scope of the present disclosure.

As shown in FIG. 9, at (402), the method 400 may include receiving sensor data from a sensor having a first field-of-view relative to a support surface across which an agricultural machine is being traversed as the agricultural machine is operating within a first operating mode. For example, as indicated above, when the agricultural machine 101 is operating in its first or field mode, the controller 110 may be configured to receive sensor data from the associated sensor (s) 102 of the multi-modal sensor system 100 while the sensor(s) 102 has a first field-of-view 104 relative to the adjacent support surface 118.

Additionally, at (404), the method 400 may include analyzing the sensor data generated when the sensor has the first field-of-view to provide a first control output associated with operation of the agricultural machine within the first operating mode. For example, as indicated above, the controller 110 may be configured to analyze the data received from each sensor 102 and generate one or more control outputs associated with operation of the agricultural machine 101 within its field mode, such as control outputs associated with automatically adjusting an operating parameter of the agricultural machine 101 as the agricultural machine 101 is performing the associated agricultural operation and/or control outputs associated with generating a notification for the operator of the agricultural machine 101.

Moreover, at (406), the method 400 may include receiving a signal associated with transitioning the agricultural machine between the first operating mode and the second operating mode. For example, as indicated above, the operator-controlled input device 316 may deliver a signal in response to an operator input to the controller 110, which indicates the operator's intention to transition the agricultural machine 101 between a field mode and a travel mode. In addition (or as an alternative thereto), the controller 110 may an input (a speed, position, or configuration input) from the non-operator-controlled input device 318 that indicates the agricultural machine 101 is transitioning between a field mode and a travel mode.

Following receipt of the input, the method 400 may, at (408), include controlling an operation of at least one component of the agricultural machine such that the sensor is moved relative to the support surface to adjust a field-of-view of the sensor between the first field-of-view and a second field-of-view. For example, as indicated above, the controller 110 may control the operation of one or more machine actuators 130 to transition the machine 101 between its first and second operating modes, which may, in turn, result in the associated sensor 102 being moved to adjust its field of view. In addition (or as an alternative thereto), the controller 110 may be configured to control the operation of a corresponding sensor actuator 226 associated with the sensor 202 to adjust the sensor's field of view.

Referring still to FIG. 9, at (410), the method 400 may include receiving sensor data from the sensor having the second field-of-view relative to the support surface as the agricultural machine is operating within its second operating mode. For example, as stated previously, when the agricultural machine 101 is operating within its second operating mode (e.g., a transport mode), the controller 110 controller 110 may be configured to receive sensor data from the associated sensor(s) 102 while the sensor(s) 102 has its second field-of-view 106 relative to the adjacent support surface 118.

Additionally, at (412), the method 400 may include analyzing the sensor data generated when the sensor has the second field-of-view to provide a second control output associated with operation of the agricultural machine 101 within the second operating mode. For example, as indicated above the controller 110 may be configured to analyze the data received from each sensor 102 and generate one or more control outputs associated with operation of the agricultural machine 101 within its transport mode, such as control outputs associated with automatically adjusting an operating parameter of the agricultural machine 101 as the machine 101 is being transported and/or control outputs associated with generating a notification for the operator of the agricultural machine 101.

It is to be understood that the steps of the method 400 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the method 400, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A multimodal sensing system for agricultural machines, the system comprising:

an agricultural machine operable in a first operating mode and a second operating mode, wherein the first operating mode comprises a field mode during which the agricultural machine is configured to perform an agricultural operation relative to a field and wherein the second operating mode comprises a transport mode during which the agricultural machine is configured to be transported between two locations without performing an agricultural operation;

a sensor coupled to the agricultural machine such that the sensor is movable relative to a support surface across which the agricultural machine is traversed to adjust a field-of-view of the sensor between a first field-of-view and a second field-of-view, the first field-of-view differing from the second field-of-view relative to the support surface, the sensor configured to generate sensor data associated with the first field-of-view when the agricultural machine is operating in the first operating mode and generate sensor data associated with the second field-of-view when the agricultural machine is operating in the second operating mode;

a controller communicatively coupled to the sensor, the controller configured to analyze the sensor data received when the sensor has the first field-of-view relative to the support surface so as to provide a first output signal associated with operation of the agricultural machine in the first operating mode, the controller being further configured to analyze the sensor data received when the sensor has the second field-of-view relative to the support surface so as to provide a second output signal associated with operation of the agricultural machine in the second operating mode.

2. The system of claim 1, wherein the controller is configured to analyze the sensor data received when the sensor has the first field-of-view to determine a work-related parameter associated with the performance of the agricultural operation and wherein the controller is configured to analyze the sensor data received when the sensor has the second field-of-view to determine a transport-related parameter associated with transporting the agricultural machine between the two locations.

3. The system of claim 2, wherein the first output signal is associated with at least one of automatically adjusting the operation of the agricultural machine during the performance of the agricultural operation based on the determined work-related parameter or generating an operator notification associated with the determined work-related parameter, wherein the second output signal is associated with at least one of automatically adjusting the operation of the agricultural machine during transport between the two locations based on the determined transport-related parameter or generating an operator notification associated with the determined transport-related parameter.

4. The system of claim 1, wherein the sensor has the first field-of-view when the sensor is disposed at a first sensor position relative to the support surface and wherein the sensor has the second field-of-view when the sensor is disposed at a second sensor position relative to the support surface, the first sensor position differing from second sensor position.

5. The system of claim 4, wherein the first sensor position is associated with at least one of a first sensor height or a first sensor orientation relative to the support surface and the second sensor position is associated with at least one of a second sensor height or a second sensor orientation relative to the support surface, the at least one of the first sensor height or the first sensor orientation differing from the at least one of the second sensor height or the second orientation.

6. The system of claim 4, wherein the sensor is fixedly coupled to a portion of the agricultural machine such that the sensor moves between the first and second sensor positions with adjustments of a position of the portion of the agricultural machine relative to the support surface.

7. The system of claim 6, wherein the agricultural machine comprises a multi-section implement including a central section and at least one outer section, the portion of the agricultural machine comprising the at least one outer section such that the sensor moves between the first and second sensor positions when the at least one outer section is actuated relative to the central section.

8. The system of claim 4, wherein the sensor is adjustably coupled to a portion of the agricultural machine such that the sensor is moveable between the first and second sensor positions independent of the portion of the agricultural machine.

9. The system of claim 8, wherein the sensor is coupled to the portion of the agricultural machine via an actuatable mounting assembly.

10. A method for collecting data associated with the operation of an agricultural machine in different operating modes, the agricultural machine being operable within both a first operating mode and a second operating mode, the method comprising:
receiving, with a computing device, sensor data from a sensor having a first field-of-view relative to a support surface across which the agricultural machine is being traversed as the agricultural machine is operating within its first operating mode, wherein the first operating mode comprises a field mode during which the agricultural machine is configured to perform an agricultural operation relative to a field;
analyzing, with the computing device, the sensor data generated when the sensor has the first field-of-view to provide a first control output associated with operation of the agricultural machine within the first operating mode;
receiving, with a computing device, a signal associated with transitioning the agricultural machine between the first operating mode and the second operating mode;
following receipt of the signal, controlling an operation of at least one component of the agricultural machine such that the sensor is moved relative to the support surface to adjust a field-of-view of the sensor between the first field-of-view and a second field-of-view, the second field-of-view differing from the first field-of-view;
receiving, with the computing device, sensor data from the sensor having the second field-of-view relative to the support surface as the agricultural machine is operating within its second operating mode, wherein the second operating mode comprises a transport mode during which the agricultural machine is configured to be transported between two locations without performing an agricultural operation; and
analyzing, with the computing device, the sensor data generated when the sensor has the second field-of-view to provide a second control output associated with operation of the agricultural machine within the second operating mode.

11. The method of claim 10, wherein the sensor is fixedly coupled to a portion of the agricultural machine, wherein controlling the operation of the at least one component of the agricultural machine such that the sensor is moved relative to the support surface comprises controlling the operation of the at least one component such that a position of the portion of the agricultural machine is adjusted relative to the support surface.

12. The method of claim 11, wherein the agricultural machine comprises a multi-section implement including a central section and at least one outer section, the portion of the agricultural machine comprising the at least one outer section such that the sensor moves relative to the support surface when the at least one outer section is actuated relative to the central section.

13. The method of claim 10, wherein analyzing the sensor data generated when the sensor has the first field-of-view comprises analyzing the sensor data to determine a work-related parameter associated with the performance of the agricultural operation, and wherein analyzing the sensor data generated when the sensor has the second field-of-view comprises analyzing the sensor data to determine a transport-related parameter associated with transporting the agricultural machine between the two locations.

14. The method of claim 13, wherein the first control output is associated with at least one of automatically adjusting the operation of the agricultural machine during the performance of the agricultural operation based on the determined work-related parameter or generating an operator notification associated with the determined work-related parameter, and wherein the second control output is associated with at least one of automatically adjusting the operation of the agricultural machine during transport between the two locations based on the determined transport-related parameter or generating an operator notification associated with the determined transport-related parameter.

15. The method of claim 10, wherein the sensor has the first field-of-view when the sensor is disposed at a first sensor position relative to the support surface, and wherein the sensor has the second field-of-view when the sensor is disposed at a second sensor position relative to the support surface, the first sensor position differing from the second sensor position.

16. The method of claim 15, wherein controlling the operation of the at least one component of the agricultural machine such that the sensor is moved relative to the support surface comprises controlling the operation of the at least one component such that at least one of a height or an orientation of the sensor is adjusted relative to the support surface to move the sensor from the first sensor position to the second sensor position.

17. The method of claim 15, wherein the sensor is adjustably coupled to a portion of the agricultural machine, wherein controlling the operation of the at least one component of the agricultural machine such that the sensor is moved relative to the support surface comprises controlling the operation of the at least component such that the sensor is moved relative to the support surface independent of the portion of the agricultural machine.

18. The method of claim 17, wherein the sensor is coupled to the portion of the agricultural machine via an actuatable mounting assembly, wherein controlling the operation of the at least one component of the agricultural machine comprises controlling the operation of a component of the actuatable mounting assembly to actuate the sensor relative to the portion of the agricultural machine.

* * * * *